(12) United States Patent
Lin

(10) Patent No.: US 6,768,077 B1
(45) Date of Patent: Jul. 27, 2004

(54) TUBE ELECTRODE STABILIZER FOR AN EDM DRILLING

(75) Inventor: Tung-Han Lin, Tainan Hsien (TW)

(73) Assignee: Tai-I Electron Machining Co., Ltd., Tainan Hsien (TW)

( * ) Notice: Subject to any disclaimer, the term of this patent is extended or adjusted under 35 U.S.C. 154(b) by 0 days.

(21) Appl. No.: 10/434,188

(22) Filed: May 9, 2003

(51) Int. Cl.⁷ .............................. B23H 1/00; B23H 7/26
(52) U.S. Cl. .................................................. 219/69.15
(58) Field of Search ......................... 219/69.11, 69.15, 219/69.2; 204/224 M; 205/665

(56) References Cited

U.S. PATENT DOCUMENTS 3,711,675 A * 1/1973 Girardin .................. 219/69.15
4,403,129 A * 9/1983 Baker ....................... 219/69.15
6,127,642 A * 10/2000 Gleason et al. .......... 219/69.15

* cited by examiner

Primary Examiner—Geoffrey S. Evans
(74) Attorney, Agent, or Firm—Rosenberg, Klein & Lee

(57) ABSTRACT

A tube electrode stabilizer for an EDM drilling includes a stabilizer block and a mover. The stabilizer block has a concaved in shaped supporting wall that parallels to the traveling path of a tube electrode, and has a plurality of apertures interconnected to air vacuuming connections to suck air. The mover is connected to the stabilizer block for approaching the tube electrode. Suction force pushes the tube electrode against the supporting wall to achieve stabilization of the tube electrode. The stabilizer block further has a sensor to detect whether the tube electrode is seated into the stabilizer block or not and to measure the available length of the tube electrode before or after drilling.

4 Claims, 4 Drawing Sheets

TUBE ELECTRODE STABILIZER FOR AN EDM DRILLING

BACKGROUND OF THE INVENTION

1. Field of the Invention

The present invention relates to a tube electrode stabilizer, and more particularly, to a tube electrode stabilizer for an EDM drilling.

2. Description and the Prior Art

EDM drilling requires more considerations than die sinker Electrical Discharge Machine (EDM) in terms of the tube electrode rigidity and the supply of the dielectric fluid. Typically, holes drilled on a work piece are deep and small, and a tube electrode is used to make the holes and supply dielectric fluid for EDM drilling. The fluid is pressurized to flush away the chips generated during EDM process.

For material removal, EDM discharge power is generated within the gap formed between the tube electrode and the work piece. Discharging creates pressure pushing a lower end of the tube electrode upward and causing the tube electrode to bend especially for a small diameter tube. The pressurized fluid supplied through the tube electrode and fraction between the tube electrode and guide also contribute to the bending of the tube electrode making the tube electrode unstable.

As shown in FIG. 4, a tube electrode 5 is clamped, rotated and inserted into a guide 6 near a work piece 7 by a collet 4 of a spindle 3. Due to the hollow and thin body of the tube electrode 5, for example, 400 mm long and 0.3 mm (and less) in diameter, the tube electrode 5 has very poor rigidity. The top and the center portions of the tube electrode 5 will swing outwardly when a bending force is encountered.

The swing of the top and the center portions of the tube electrode 5 affects the accuracy and efficiency of the electrode discharge machining. This invention is therefore to solve the above-mentioned shortcomings.

SUMMARY OF THE INVENTION

The primary objective of the present invention is to provide a tube electrode stabilizer for an EDM drilling comprising a stabilizer block and a mover. The stabilizer block has a concaved in shaped supporting wall that parallels to the traveling path of a tube electrode, and has a plurality of apertures interconnected to vacuuming connections to suck air. The mover is connected to the stabilizer block for approaching the tube electrode. Suction force pushes the tube electrode against the supporting wall to achieve stabilization of the tube electrode.

The secondary objective of the present invention is to provide a tube electrode stabilizer further having a sensor to detect whether the tube electrode is seated into the stabilizer block or not and to measure the available length of the tube electrode before or after drilling.

DETAILED DESCRIPTION OF THE PREFERRED EMBODIMENT

Figure 1:
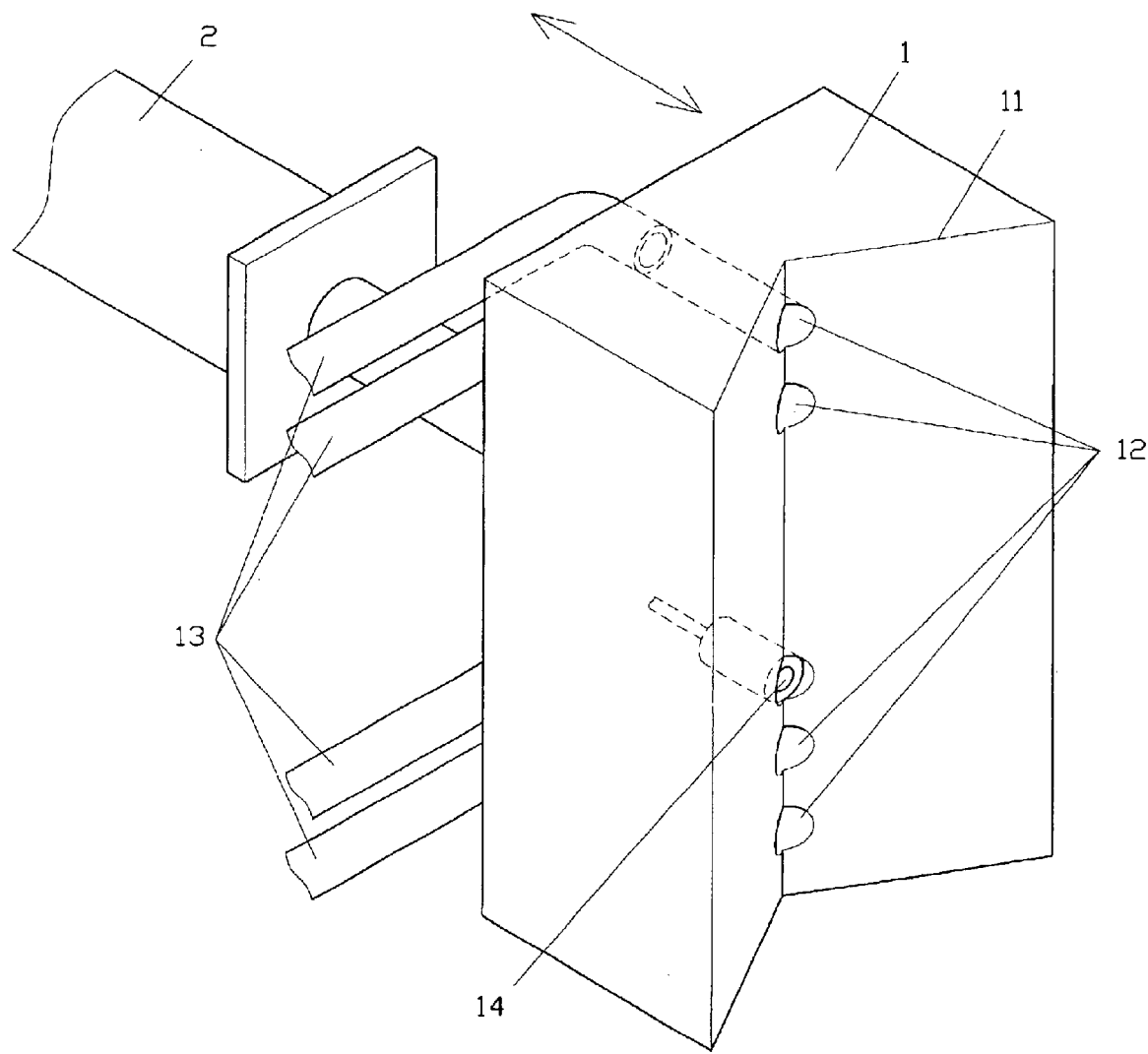
FIG. 1 is a perspective view of the present invention.

As shown in FIG. 1, a tube electrode stabilizer for an EDM drilling of the present invention comprises a stabilizer block 1 and a mover 2. The stabilizer block 1 has a concaved in shaped supporting wall 11 with a wider opening at an outer portion, and a plurality of apertures 12 interconnected to air vacuuming connections 13 to a vacuum (not shown on the drawings) to suck air. The mover 2 is connected with the stabilizer block 1 to move the stabilizer block 1 to approach a tube electrode 5. A sensor 14 is provided to detect whether the tube electrode 5(as shown in FIG. 2) is seated on the supporting wall 11 of the stabilizer block 1.

Figure 2:
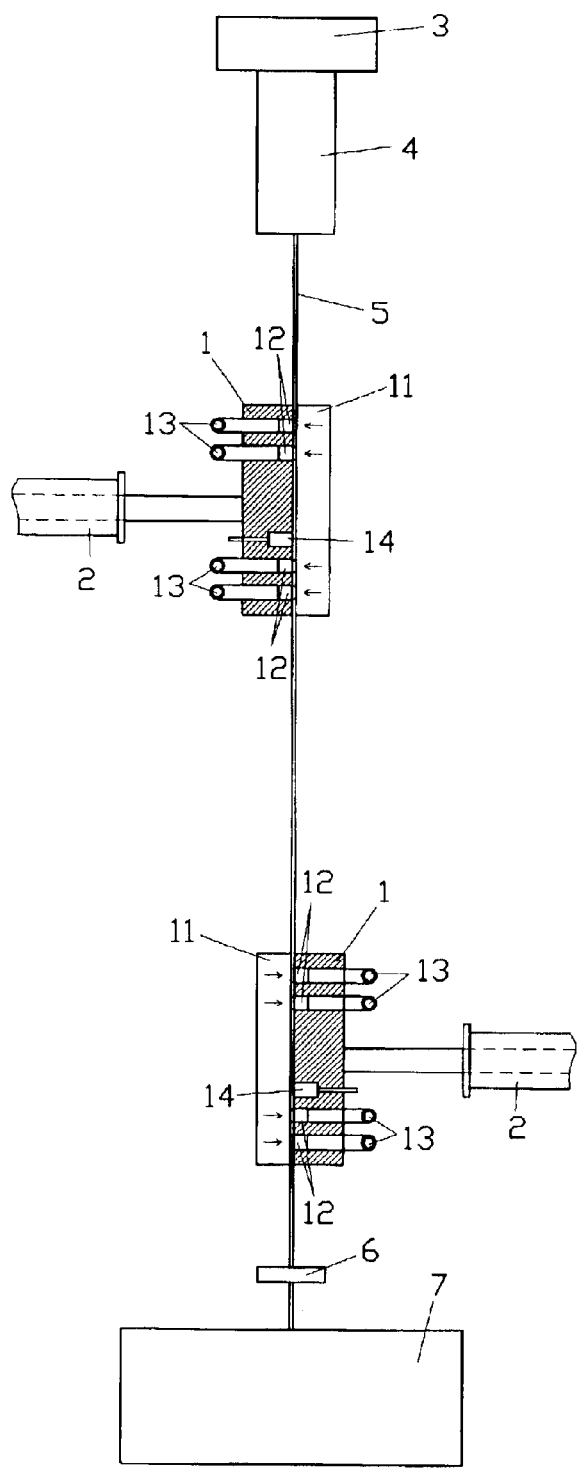
FIG. 2 is a side view of the present invention.

As shown in FIG. 2, two sets of the stabilizer blocks 1 and the movers 2 are adapted at the same time to provide better stability for a long tube electrode (more than two sets can be used for a longer tube electrode). The tube electrode 5 is clamped, rotated and inserted into a guide 6 near a work piece 7 by a collet 4 of a spindle 3.

Figure 3:
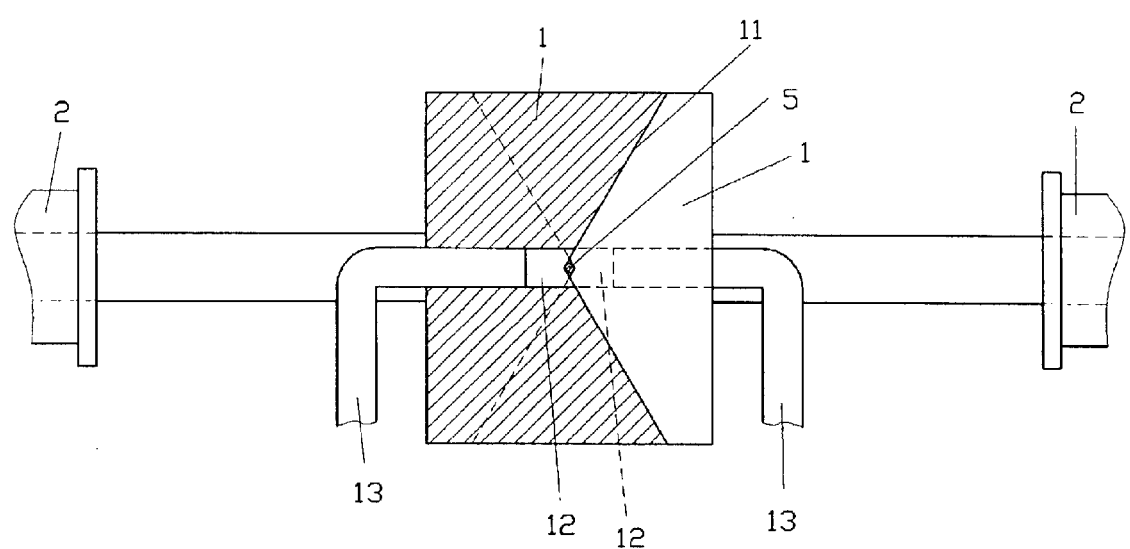
FIG. 3 is a top view of FIG. 2.
Figure 4:
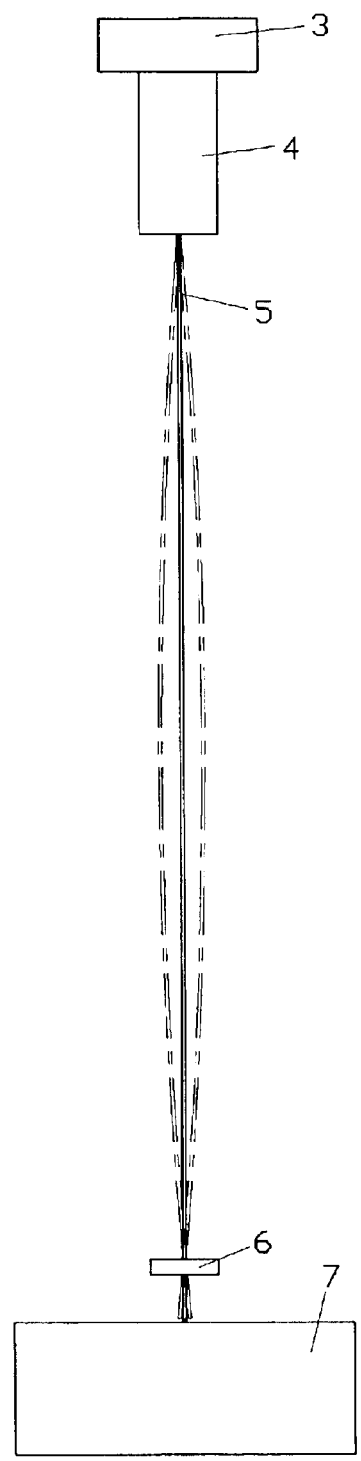
FIG. 4 is a side view of a prior art.

The stabilizing block 1 is connected and moved by the mover 2. To stabilize the tube electrode 5, the stabilizing block 1 is moved toward the tube electrode 5 such that it is close enough to suck the tube electrode 5 onto the supporting wall 11, as shown in FIG. 3. As discharge machining procedure, the tube electrode 5 gets shorter and the position of the spindle 3 becomes lower. The stabilizing block 1 is then moved away from the tube electrode 5 to avoid collision between the spindle 3 and the stabilizing block 1.

The sensor 14 on the supporting wall 11 of the stabilizer block 1 detects whether or not the tube electrode 5 is present or seated. Available length of the tube electrode 5 is measured when the tube electrode 5 descends or ascends, before or after drilling, by knowing the position of the spindle 3 right at the moment where the sensor 14 detects change in the presence of the tube electrode 5.

The presence of the tube electrode 5 blocks the air flow into the apertures 12 resulting in lower air flow and vise versa when there is no tube electrode 5 to obstruct the air flow. Hence, an air flow rate detector can be used as a sensor.

I claim:

1. A tube electrode stabilizer for an EDM drilling comprising:

a stabilizer block having a concaved in shaped supporting wall and a plurality of apertures, and a mover connected with said stabilizer block, wherein said apertures of said stabilizer blocks are interconnected to vacuuming connections, said mover moves said stabilizer block to approach said tube electrode, said vacuuming connections sucks air through said apertures to suck said tube electrode onto a surface of said supporting wall of said stabilizer block.

2. The tube electrode stabilizer for an EDM drilling, as recited in claim 1, wherein said stabilizer block further comprises a sensor to detect whether said tube electrode is present or seated onto the surface of said supporting wall.

3. The tube electrode stabilizer for an EDM drilling, as recited in claim 2, wherein said sensor detects an available length of said tube electrode by detecting a change in presence of said tube electrode when said tube electrode ascends or descends.

4. The tube electrode stabilizer for an EDM drilling, as recited in claim 2, wherein said sensor detects said tube electrode by detecting a variation of flow rate of sucked air.

* * * * *